United States Patent [19]
Ikeda et al.

[11] 3,915,745
[45] Oct. 28, 1975

[54] SYSTEM AND METHOD FOR OPERATION OF A METAL-AIR SECONDARY BATTERY

[75] Inventors: Hironosuke Ikeda, Hirakata; Masaru Inaba, Kyoto; Masahiro Ide, Hirakata, all of Japan

[73] Assignee: Agency of Industrial Science and Technology, Japan

[22] Filed: Nov. 9, 1973

[21] Appl. No.: 414,253

[30] Foreign Application Priority Data
Dec. 9, 1972  Japan.............................. 47-123048
Dec. 27, 1972  Japan.............................. 47-130020
Feb. 9, 1973  Japan.............................. 48-16713

[52] U.S. Cl. ............. 136/86 A; 136/86 S; 136/159
[51] Int. Cl.² .................. H01M 29/02; H01M 27/26
[58] Field of Search .................. 136/86 A, 86 S, 159

[56] References Cited
UNITED STATES PATENTS
3,359,136  12/1967  Merten et al. ..................... 136/86 A
3,392,057  7/1968  Sakagami et al. .................. 136/86 A Primary Examiner—John H. Mack
Assistant Examiner—Hugh A. Feeley
Attorney, Agent, or Firm—Staas & Halsey

[57] ABSTRACT

The present invention comprises a system for and method of operation of a metal-air secondary battery of an electrolyte circulation type comprising a charging circulation system including an electrolyte tank with a large capacity detachably connectable by a pair of pipe connectors to the apparatus and a discharging circulation system with a small capacity, these two circulation systems being alternatively changed over by means of a two-circuit three-way cock. In a charging mode, the body of a metal-air secondary battery is connected to said tank which is usually installed in a charging station so that an active metal may be efficiently electrodeposited using an ordinary circulation method, and in a discharging mode, the tank is detached and the battery is connected to the discharging circulation system so that a minimum quantity of electrolyte, necessary for discharging, may be circulated. Therefore, the system of the present invention is advantageous in that the weight and capacity size of a power supply are reduced by half as compared with those of conventional systems, with the result of an improved ratio of energy to weight and size, and is extremely useful when used in a vehicle borne metal air battery, for example, an air zinc battery for an electric automobile.

12 Claims, 9 Drawing Figures

SYSTEM AND METHOD FOR OPERATION OF A METAL-AIR SECONDARY BATTERY

BACKGROUND OF THE INVENTION

1. Field of the Invention

The present invention relates to a system and method for operation of a metal-air secondary battery of an electrolyte circulation type. More particularly, the present invention relates to an improved system and method for circulation of the electrolyte of a metal-air secondary battery which includes metal such as zinc, cadmium or the like as an active material.

2. Description of the Prior Art

Operation of a battery including metal such as zinc, cadmium or the like as an active material, for example an air zinc battery, comprises repetition of a discharging cycle wherein metal such as zinc, cadmium or the like is dissolved in electrolyte and a charging cycle wherein the dissolved metal is redeposited in a cathode plate. A battery of this type is preferable in that the energy to be utilized per unit weight and unit size of the battery is large as compared with batteries of other types. However, in an actual application of a battery of this type, it is necessary to employ an electrolyte circulation system. Necessity of an electrolyte tank of a large capacity for this purpose results in decrease of energy utilization efficiency, in relation to the weight and size of the whole battery, in other words, results in increase of weight and size of the battery required, per unit of energy to be provided.

More particularly, in consideration of the fact that the solubility of zinc versus potassium hydroxide electrolyte is 8 – 10 percent at most, it is required that the total quantity of zinc of the battery be dissolved in electrolyte before it becomes saturated in order to redeposite zinc on the cathode plate from the electrolyte including dissolved zinc. Therefore, the quantity of electrolyte required for a unit cell, for example, with an acting area of $300 \text{ cm}^2$ is 0.8 – 1l. As a result, the quantity of electrolyte in the tank becomes extremely large as compared with the quantity of electrolyte stored in the body portion of an ordinary battery, and occasionally the weight of the tank exceeds the total weight of the main battery portion. It is desired to reduce the weight of a metal-air secondary battery of an electrolyte circulation type, particularly the weight and size thereof as required for the discharging cycles of such a battery.

SUMMARY OF THE INVENTION

In brief, the present invention comprises apparatus for circulating electrolyte in a metal-air secondary battery, to which there is selectively connected a discharging mode circulation system having a small quantity of electrolyte, preferably in a fixed manner, and a charging mode circulation system having a large quantity of electrolyte, in a detachable manner, selectively by means of a flow path switch. In operation, selective turning of the flow path switch to a discharging mode or a charging mode forms a closed circulation system of a small capacity or a large capacity, respectively. Since the charging mode circulation system of a large capacity is detached in the discharging mode, the total weight and capacity of the closed circulation system used for the discharging mode is decreased. The inventors of the present invention confirmed experimentally the fact that the discharging operation in such a circulation system employing only a small quantity of electrolyte has no substantially unfavorable effect on the operation of a metal-air secondary battery. On the other hand, the charging mode is performed using the circulation system having a large quantity of electrolyte so as to satisfy the preferred operation conditions required for the charging operation of the metal-air secondary battery.

Therefore, an object of the present invention is to provide a system and method for circulation of electrolyte for a metal-air secondary battery of an electrolyte circulation type.

Another object of the present invention is to reduce the total weight and volume, or size, of the system as employed in the dicharging mode of a metal-air secondary battery of an electrolyte circulation type.

A further object of the present invention is to provide an improved electrolyte circulation method, wherein the discharging mode of a metal-air secondary battery of an electrolyte circulation type is performed using a small quantity of electrolyte and wherein the charging mode thereof is performed using a large quantity of electrolyte.

A still further object of the present invention is to provide a system for operation of a metal-air secondary battery of an electrolyte circulation type wherein, in a charging mode, a circulation system having a large quantity of electrolyte is connected in a detachable manner to the battery electrolyte circulation system.

These and other objects and features of the present invention will become more apparent in the light of the following detailed description of the present invention made with reference to the drawings.

BRIEF DESCRIPTION OF THE DRAWINGS

In the drawings, like reference characters designate like parts.

DESCRIPTION OF THE PREFERRED EMBODIMENTS

Figure 1:
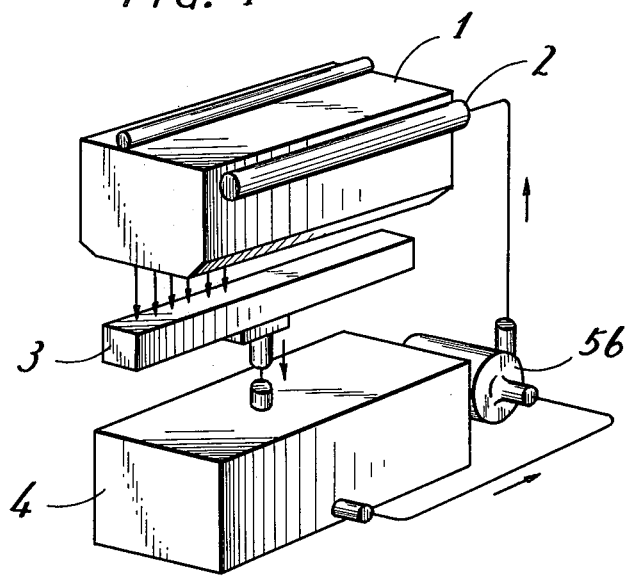
FIG. 1 is a perspective view of an air zinc battery of typical prior art.

With reference to FIG. 1, a perspective view of an air zinc secondary battery of typical prior art is shown. A battery 1 comprises a stack of many unit cells. The battery 1 is provided with a collector 3 to receive electrolyte overflowing from each of the unit cells and a distributor 2 which supplies electrolyte for each of the unit cells. The electrolyte in the collector 3 is introduced into an electrolyte tank 4 and the electrolyte in the electrolyte tank 4 is sent to the distributor 2 through a circulation pump 56 and then it is distributed to each of the unit cells. All the components illustrated show formation of a closed electrolyte circulation path or system. As can be seen from the abovementioned description, the quantity of electrolyte in the electrolyte tank 4 is determined so as to ensure that the solubility of zinc at the end of discharging cycles is less than the saturated solubility and accordingly preferred charging cycle conditions are fulfilled. The electrolyte of the illustrated battery is circulated during the discharging mode and charging mode through the abovementioned closed electrolyte circulation system. The abovementioned circulation system usually comprises, as stated above, the electrolyte tank 4 with a large capacity, which would be disadvantageous with respect to weight and capacity in an actual application of a battery of this type, particularly in case of a vehicle borne battery such as a power supply of an electric automobile.

Figure 2:
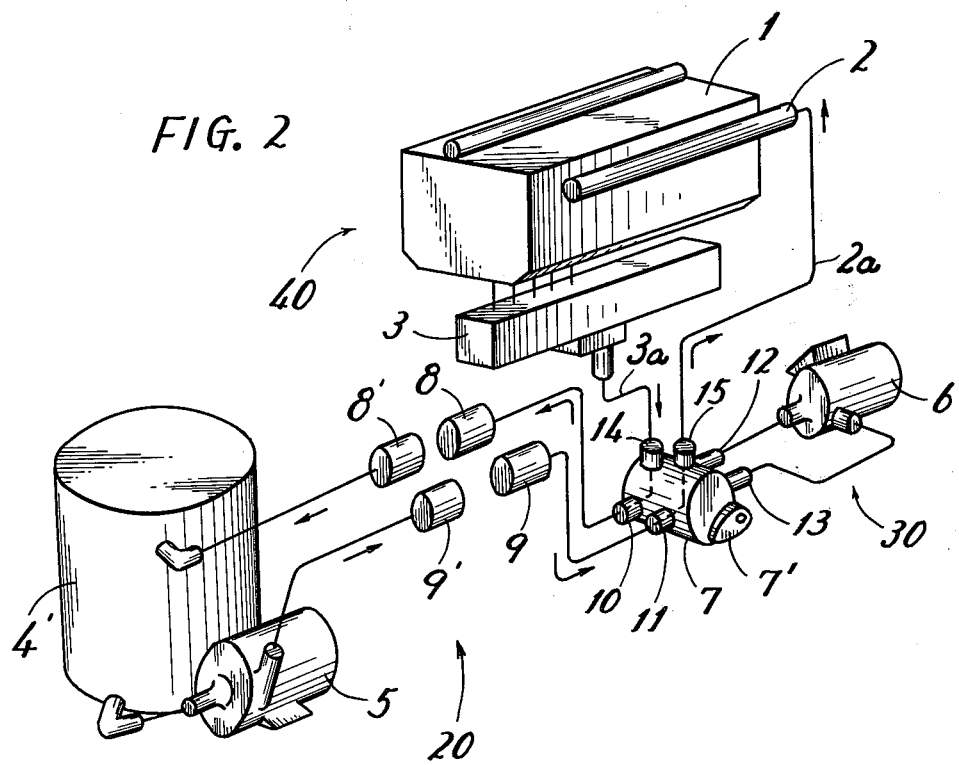
FIGS. 2 and 3 are views showing a charging mode and a discharging mode, respectively, of an embodiment in accordance with the present invention.
Figure 3:
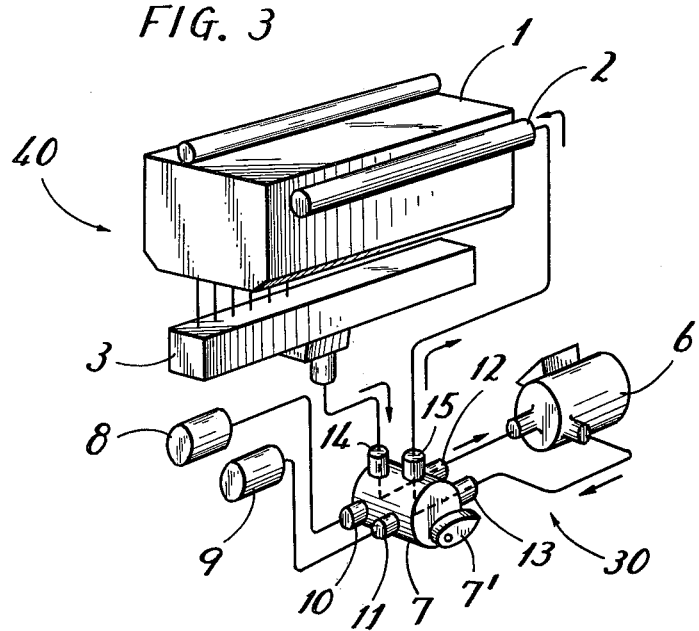

FIGS. 2 and 3 are perspective views of a battery in the charging mode and discharging mode, respectively, of an embodiment of the present invention.

With reference to FIG. 2, the illustrated battery of the embodiment comprises a first detachable circulation system 20 and a second partial circulation system 30 which can be selectively connected using a three-way cock 7. The systems 20 and 30 are alternatively selected and directly connected to another partial circulation system 40 which comprises a distributor 2 and a collector 3 so as to form a closed circulation system. More particularly, a pipe 3a which communicates with the collector 3 and a pipe 2a which communicates with the distributor 2 are connected to an inlet 14 and outlet 15, respectively, of a two-flow path three-way cock 7. An outlet 10 and inlet 11 on one side of the said cock are connected to an electrolyte tank 4' and a charging circulation pump 5 through pipe connectors 8 and 8' and 9 and 9', respectively, to form the said first or charging mode detachable partial circulation system 20. Similarly, an outlet 12 and inlet 13 on the other side of the cock 7 are connected to a discharging circulation pump 6 to form the second or discharging mode partial circulation system 30. As stated above, the battery shown in FIG. 2 is in the charging mode, and therefore a knob 7' is turned to the outlet 10 and inlet 11, and as indicated by the dotted line in the cock 7, the first partial circulation system 20 and the partial circulation system 40 form a closed circulation system for the charging mode. It should be pointed out that the connectors 8–8' and 9–9' shown in FIG. 2 are detached for simplicity of understanding.

With reference to FIG. 3, a perspective view of a battery in the state of a discharging mode is shown as mentioned above. The knob 7' of the cock is turned to the outlet 12 and inlet 13 and in the cock 7 the second partial circulation system 30 and the partial circulation system 40 form a closed circulation system for the discharging mode, as shown by the dotted line. The first partial circulation system 20 does not serve to form a closed circulation system in the discharging mode, and accordingly the connectors 8–8' and 9–9' can be detached from each other. Therefore, the circulation system 20 is removed as shown in FIG. 3. In preferred applications of the battery of the invention, a closed circulation system comprising only partial circulation systems 30 and 40 as shown in FIG. 3 is borne in a vehicle such as an electric automobile, and on the other hand the removed partial circulation system 20 is disposed in a charging station.

The battery of the present invention is operated in accordance with the following steps.

CHARGING MODE

Step 1: Completion of Charging Mode Circulation System

The battery 1 as combined with the partial circulation system 30 is brought to the partial circulation system 20, the pipe connectors 8 and 9 are connected, and the knob 7' of the cock 7 is set as indicated in FIG. 2 to form a charging mode closed circulation system with the partial circulation system 20 and 40. In this condition, zinc oxide is dissolved in a saturated state in the form of zincate ions in the electrolyte in the tank 4.

Step 2: Circulation and Charging in Charging Mode Circulation System

Driving of the charging pump 5 causes the electrolyte to circulate through the partial circulation systems 20 and 40. More particularly, the electrolyte in the tank 4 is discharged and sent to each of the unit cell casings through the pump 5 — pipe connectors 9–9' three-way cock 7 — distributor 2, and the electrolyte overflowing from each of the unit cell casings returns to the tank 4' through the collector 3 — three-way cock 7 — pipe connectors 8–8', and thus the electrolyte in the unit cell casings is renewed continually by returning flow as indicated by the arrows in the drawings.

Meanwhile, in each of the unit cell casings, the current which flows between a cathode plate comprising a wire gauze or a perforated metal and an air permeable electrode or charging auxiliary electrode causes reduction of zincate ions of the electrolyte on the cathode plate so that zinc is electrodeposited. At the end of charging, the electrolyte in the tank 4 becomes potassium, hydroxide which includes a small amount of zincate ions.

Figure 4:
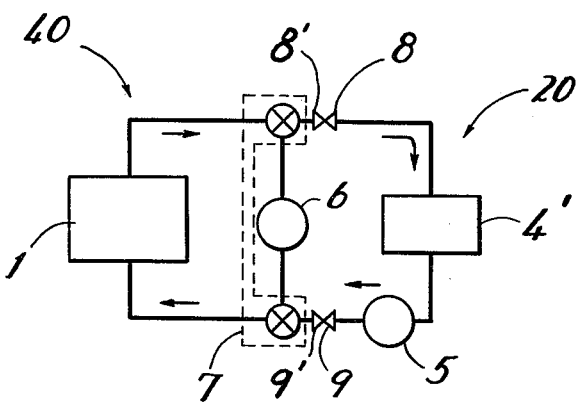
FIGS. 4 and 5 are schematic diagrams of the circulation systems of FIGS. 2 and 3, respectively.

The circulation system of the battery of the invention in this step is schematically shown in FIG. 4. Since the same parts are indicated by the same characters, it would not be necessary to make more detailed description.

DISCHARGING MODE

Step 3: Completion of Discharging Mode Circulation System

When the battery is used in a discharging mode, the cock 7 is turned to the discharging pump 6, as shown in FIG. 3, and the tank 4 is detached at the pipe connectors 8' and 9' and is used as a vehicle borne power supply in the state of FIG. 3.

Step 4: Circulation and Discharging in Discharging Mode Circulation System

Driving of the discharging pump 6 enables the electrolyte to circulate through the partial circulation systems 30 and 40. During the circulation in these circulation systems, discharge is caused to occur, that is, electric power is withdrawn from the battery 1.

Figure 5:
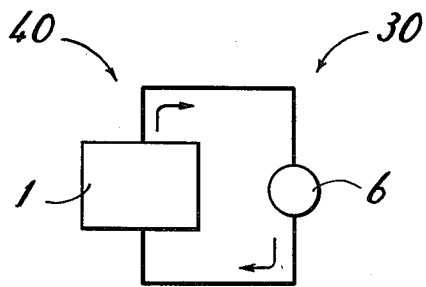

In this case, the minimum quantity of circulation electrolyte necessary for discharging remains in the battery 1, collector 3 and pipes, and driving of the discharging pump 6 enables the electrolyte to circulate in the flow path of FIG. 5, while discharge occurs.

In accordance with the present invention, the abovementioned operation modes are repeated in turn.

Meanwhile, in accordance with the present invention, the zinc on the cathode plate is dissolved in the discharging mode due to discharging reaction to increase the density of zincate ions in the circulating electrolyte, and since the electrolyte reaches the saturated point faster at the time of discharging as compared with conventional systems wherein a large quantity of circulating electrolyte is used, efficiency of the reaction is relatively reduced. However, it was found as a result of experiments that the zincate ions in the saturated electrolyte have no substantial problem since they are deposited as zinc oxide in the cell casing of the battery, which zinc oxide is not related to the circulation system.

Figure 6:
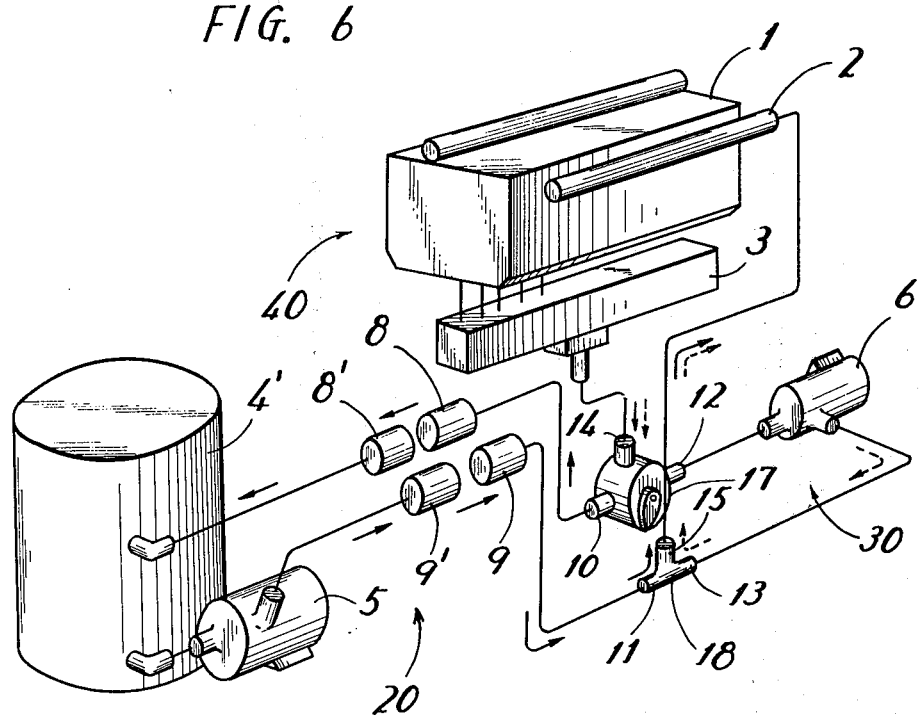
FIG. 6 is a perspective view of the system of a preferred embodiment of the present invention.

FIG. 6 shows a perspective view of a more preferred embodiment of the invention. The embodiment of FIG. 6 comprises a one-circuit three-way cock 17 for a circuit of one side instead of the two-circuit three-way cock 7 of the embodiment of FIG. 2 and a Tee 18 instead of the other circuit of the embodiment of FIG. 2. The structure of the other circulation systems is the same as that of the embodiment of FIG. 2 and, since the same characters designate the same parts, a further detailed description is not given.

Figure 7:
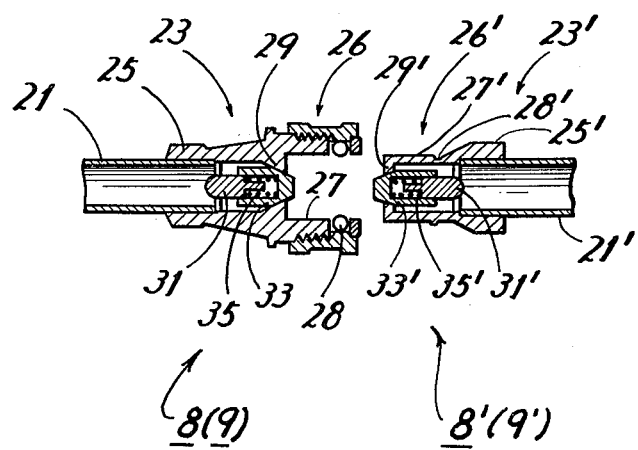
FIG. 7 is a sectional view of a connector especially suited to be used in the embodiment of FIG. 6.

FIG. 7 shows a sectional view of connectors 8–8' and 9–9' which are particularly adaptable for use in the embodiment of FIG. 6. The connectors of FIG. 7 comprise a female connector element 23 and a male connector element 23' which are matable with each other and connected to the ends of pipes 21 and 21'. The female connector element 23 comprises a tube having an end 25 which is secured to the pipe 21, an opposite end 26 wherein an aperture 27 is formed through which the abovementioned male connector element 23' is to be connected and a center portion wherein a throat 29 is formed. An axial direction guide 31 is provided in the pipe 21, in the rear of the throat 29. A valve 33 is interposed between the said throat 29 and guide 31, which covers slidably the guide 31 in an axial direction. The valve 33 is normally urged toward the throat 29 by a spring 35 to cover the throat. The pressure of the valve 33 against the spring 35 causes the valve to move rearwardly of the throat 29 in the axial direction to open the throat. The male connector element 23' is of substantially the same structure as the female connector element 23 except that a tube 27' is formed wherein the other end 26' is inserted in a connecting aperture of the female connector element 23, and therefore is shown by using the same reference characters with a prime in the same parts. In order to ensure the connection at the ultimate insertion position where both connector elements 23 and 23' are mutually inserted, a spring ring 28 and a groove 28' to receive it may be provided in the elements 23 and 23' respectively, as shown in the drawings. The connection in the ultimate insertion position by the mutual insertion of both connector elements 23 and 23' makes the valves 33 and 33' move backward in the axial direction against the springs 35 and 35' to open the throats 29 and 29' and form a communication between the pipes 21 and 21'. However, detaching the connector elements 23 and 23' from each other causes the valves 33 and 33' to press against and close the throats 29 and 29' by the action of the springs 35 and 35'.

In operation, the connectors 8–8' and 9–9' are connected to form a circulation path in the charging mode.

A knob 7' of a cock 7 is turned to the circulation system 20 to form a closed circulation system between the circulation systems 20 and 40. At that time, since the cock 7 does not form a flow path for the pump 6, the circulation system 30 causes no circulation, irrespective of the communication of the connector 9 and the insertion of the Tee 18. In the discharging mode, detachment of the connectors 8 and 9 causes closing of the flow path in the connectors 8 and 9. The knob 7' of the cock 7 is turned to the circulation path 30 to form a closed circulation system between the circulation paths 30 and 40. Thus, adoption of connectors of the structure, wherein a communication is formed between pipes in response to connection and closing of the ends of pipes is ensured in response to detachment, prevents leakage of electrolyte caused by connection and detachment of circulation pipes between a charging mode and a discharging mode and permits adoption of a one-circuit cock in place of a two-circuit cock.

Generally, the larger the capacity of a battery, the larger is the quantity of the electrolyte required. In case where the exhausted electrolyte is made to return from a battery to a tank by applying the discharging pressure of the pump 5, it is necessary to increase the discharging pressure, which causes an increase of pressure applied to a flow path and increase of leakage in an air permeable electrode due to the liquid pressure applied to the battery. Therefore, the discharging pressure of the pump 5 should be chosen so as not to deteriorate characteristics of the battery and not to cause leakage of electrolyte, and finally damage, of the air permeable electrode.

On the other hand, in case where electrolyte is made to return to the tank according to the movement of natural flow, it is necessary to make larger the diameter of a pipe for a returning flow path and the capacity of a collector tank, etc., which involves a disadvantage that the apparatus becomes undesirably larger according to the increase of the number of unit cell casings.

Figure 8:
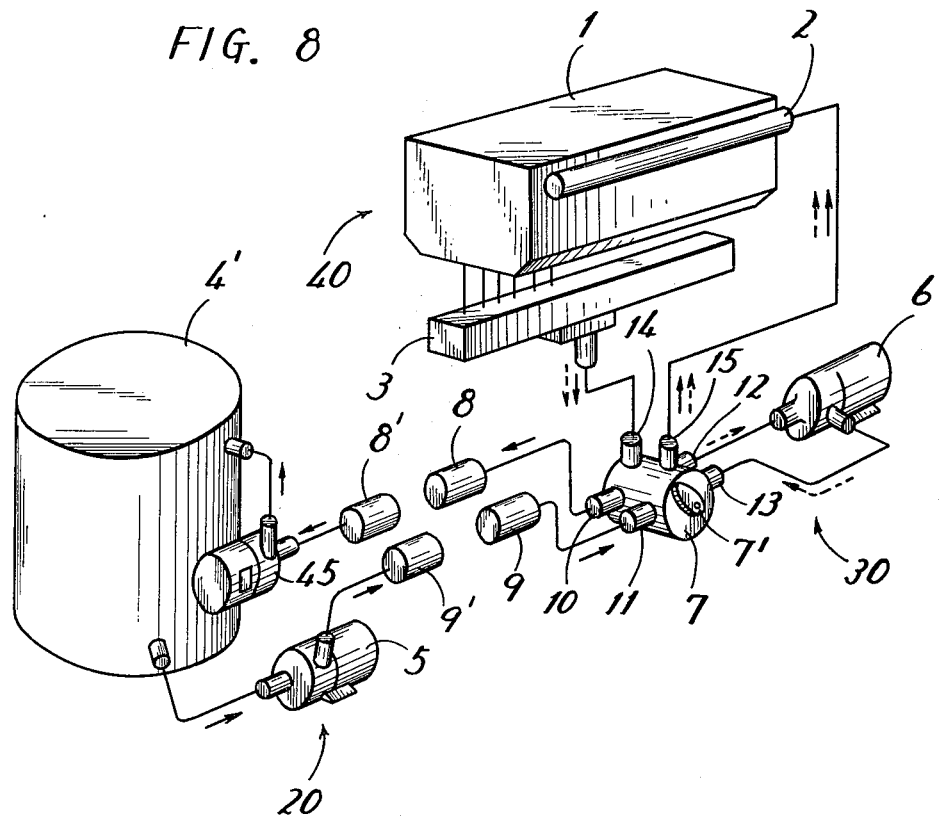
FIG. 8 shows another preferred embodiment of the present invention.

FIG. 8 shows another preferred embodiment of the present invention which comprises an improvement made in consideration of such problems. The embodidment of FIG. 8 includes a charging circulation pump 5 and an inlet pump 45 for an electrolyte tank 4' connected through connectors 8–8' and 9–9'. Other structures are the same as those in FIG. 2. Therefore the same characters are used to designate the same parts and a further detailed description thereof is omitted.

In a charging mode operation, since the embodiment shown of the present invention is provided with not only the circulation pump 5, with which the electrolyte in the tank 4 is discharged and sent to the battery 1, but also the inlet pump 45, with which the electrolyte exhausted from the battery 1 is forcibly sucked and returned to the tank 4, it is not necessary to increase the discharging pressure of the circulation pump 5, and as a result, leakage of electrolyte at the air permeable electrode due to liquid pressure may be prevented and the circulation system may be made compact by making small the diameter of the pipe of the returning flow path and the capacity of the collector tank. In addition, gases generated in the charging mode operation are sucked together with the overflowing electrolyte and separated in the tank 4 and therefore it is not necessary to provide a vent hole in the top surface of the cell casings of the battery 1 as in case of conventional systems.

A pump which may be used as the inlet pump 45 has a relatively larger output than the circulation pump 5. Since the pump 45 is required to be used only at the time of charging in accordance with the present invention, it has no effect on the output of the battery per se in the discharging mode.

In embodying the system of the present invention, the following problems result. In a conventional system wherein a large quantity of electrolyte is circulated at the time of discharging, almost all of the zinc on the cathode plate is dissolved as zincate ions in the electrolyte by the reaction represented by the following chemical equation:

$$Zn + 2OH^- + \tfrac{1}{2}O_2 \rightarrow ZnO_2 + H_2O$$

On the other hand, in the abovementioned system of the present invention wherein a small quantity of electrolyte is circulated, the density of zincate ions in the electrolyte becomes high during the process of discharging, by the reaction of $Zn + \tfrac{1}{2}O_2 \rightarrow ZnO$ and a large quantity of zinc oxide remains on the cathode plate at the end of dicharging.

Then, in case of charging in this condition in an ordinary system, most of discharging current is consumed for the reaction of electrodeposition because the efficiency of deposition of Zn on the plate from the zincate ions in the electrolyte is better than the efficiency of reduction of ZnO remaining on the plate to Zn.

Therefore, the electodeposited zinc is also deposited on the remaining zinc oxide to cause poor uniformity of the electrodeposited surface and made unstable the deposited condition on the plate, and furthermore the poor condition of charging in which dendritic zinc grows remarkably in this plate decreases the charging efficiency and the durability of cycles.

The solution to improve such an undesired condition of electrodeposition is described hereinafter. Before the ordinary charging, it is preferable to stop circulation of electrolyte and cause the electrolyte in the battery to be in a stationary state so as to charge in this state by the current with the quantity less than a half of that of ordinary charging current during a given period.

In other words, assuming that the density of the ordinary charging current is $50 - 75$ mA/cm², a preliminary charging should be effected with the density of current of $10 - 30$ mA/cm² in the stationary state of electrolyte for a preliminary charging to flow a prescribed charging current thereafter by circulating the electrolyte.

Since the preliminary charging is performed with the low density of current in a condition where zincate ions are not supplied due to the circulating electrolyte, efficiency of reduction of the remaining ZnO on the plate to Zn is improved, zinc is electrodeposited on the exposed surface of the plate, and reaction of reduction of ZnO to Zn proceeds on the remaining ZnO to reduce almost all of the ZnO on the plate.

Referring again to FIG. 3, at the time of using the battery, or in a discharging mode, the discharging circulation pump 6 is driven in a state where the electrolyte tank 4 and charging circulation pump 5 are detached and the minimum quantity of electrolyte remaining in the battery 1, collector 3 and pipes so that discharge takes place.

In this case the weight and capacity of the power supply are reduced to improve the efficiency of output as compared with conventional systems where a large quantity of electrolyte circulates even at the time of discharging. However, on the other hand, zincate ions to be dissoved in the electrolyte by the reaction reach the saturated point soon and accordingly a part of the zinc is deposited as zinc oxide in the cell casings of the battery and the other part of zinc remains in the wire gauge, etc. of the cathode plate.

Next, at the time of charging, the electrolyte tank 4 and charging pump 5 are connected with each other by the pipe connectors 8 and 9 and the cock 7 is turned from the side of the discharging pump 6 to the side of the tank 4. By driving the charging circulation pump 5 for a short period of time, the electrolyte (KOH solution where zincate ions are saturated and dissolved) which stays in the circulation path at the time of discharging is diluted evenly with a large quantity of electrolyte (pure KOH solution).

Thereafter, the operation of the charging circulation pump 5 is brought to a stop to keep the electrolyte in the battery 1 in a stationary state, in which a charging current of 20 mA/cm² is made to flow so as to reduce the zinc oxide (ZnO) remaining on the said plate to zinc (Zn) as well as to deposit zinc (Zn) on the exposed surface of the base of the plate from the electrolyte kept in the battery. In this case, the electrolyte containing zincate ions is not newly supplied, and as a result the charging current is consumed mainly for the reaction of $ZnO \rightarrow Zn$, which prevents deposition of Zn on the remaining ZnO and permits redeposition of excellent zinc electrodes.

Figure 9:
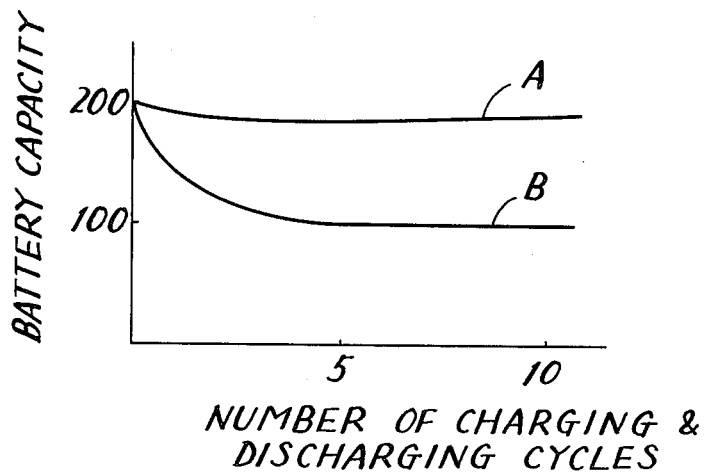
FIG. 9 is a characteristic showing the deterioration in terms of the capacity of battery versus the number of charging and discharging cycles.

FIG. 9 is a characteristic which shows deterioration of the battery capacity versus the number of charging and discharging cycles, in which curve A indicates the case where the charging system of the abovementioned embodiment is adopted, and curve B indicates the case where electrolyte is made to circulate immediately without performing the preliminary charging in accordance with the abovementioned embodiment, charging being performed with the electrolyte of 60 mA/cm². This characteristic graph shows that the abovementioned embodiment can improve the efficiency of charging and the durability of cycles.

Following the results of experiments, the proper quantity of the preliminary charging current is less than a half of the prescribed quantity of charging current, preferably one-fourth to one-third thereof, and the period long enough for flowing the current is approximately one-sixth to one-fourth of the period of charging.

As stated above, in other aspects of the present invention, in which the electrolyte tank with a large capacity is detached only at the time of discharging and the electrolyte kept in the battery is circulated so as to decrease the weight and capacity of the power supply borne in a vehicle or the like, a current having a low density is made to flow when the electrolyte is in a stationary state, before an ordinary charging, so as to reduce preliminarily the zinc oxide remaining partially on the plate, which prevents deposition of electrodeposited zinc on the remaining zinc oxide and a resultant uneven electrodeposited surface, and accordingly makes excellent the efficiency of deposition of electrodeposited zinc on the plate and the growth condition of electrodeposited zinc and results in improvement of the capacity of the battery and extension of the lifetime thereof.

While specific preferred embodiments of the present invention have been described, it will be apparent that obvious variations and modifications of the invention will occur to those skilled in the art from a consideration of the foregoing description. It is therefore de-

What is claimed is:

1. An apparatus for circulating electrolyte in a metal-air battery comprising, in combination,
   a metal-air battery having a partial electrolyte circulating system,
   first electrolyte circulating means of relatively large capacity,
   means for detachably connecting said first electrolyte circulating means to said partial electrolyte circulating system of said battery to form, selectively, a closed circulating system therewith for circulating electrolyte through said battery during a battery charging operation,
   second electrolyte circulating means having a substantially smaller capacity than the capacity of said first electrolyte circulating means and connected selectively in communication with said partial electrolyte circulating system of said battery for circulating electrolyte through said battery in a closed circulation system during a battery discharging operation, and
   flow path switch means for selectively connecting said first and second electrolyte circulating means with said partial electrolyte circulating system of said battery during battery charging and discharging operations, respectively.

2. Apparatus for circulating electrolyte in a metal-air battery in accordance with claim 1, wherein said first electrolyte circulation means comprises an electrolyte tank and a circulation pump.

3. Apparatus for circulating electrolyte in a metal-air battery in accordance with claim 1, wherein said battery comprises a battery body, a distributor and an electrolyte collector.

4. Apparatus for circulating electrolyte in a metal-air battery in accordance with claim 1, wherein said detachable connecting means include valve means responsive to detachment to close the flow path therethrough automatically.

5. Apparatus for circulating electrolyte in a metal-air battery in accordance with claim 1, wherein said flow path switch is a one-circuit switch.

6. Apparatus for circulating electrolyte in a metal-air battery in accordance with claim 2, wherein said circulation pump forces electrolyte from said tank to said battery.

7. Apparatus for circulating electrolyte in a metal-air battery in accordance with claim 2, wherein said circulation pump forces electrolyte from said battery and into said tank.

8. A method of operation of a metal-air battery having an active metal and a partial circulating system for circulation of an electrolyte therethrough and having associated therewith a first electrolyte circulating means of relatively large capacity and a second electrolyte circulating means of relatively small capacity, said battery having a charging mode of operation for depositing said active metal within said battery and a discharging mode of operation for supply of output power from said battery during which said active metal is converted into ions in solution in said electrolyte, comprising:
   during said charging mode of operation of said battery, selectively connecting said first electrolyte circulation means to said partial electrolyte circulating means of said battery to form a closed system therewith and circulating a relatively large quantity of electrolyte through said battery by said first electrolyte circulating means to convert active metal ions in solution in said electrolyte to said active metal deposits within said battery, and
   during a discharge mode of operation of said battery, disconnecting said first electrolyte circulating means of relatively large capacity from said battery and forming a closed system of said second electrolyte circulating means with said partial electrolyte circulating system of said battery, and circulating a relatively small quantity of electrolyte through said battery by means of said second electrolyte circulating means, said active metal deposited within said battery being converted to ions of said active metal in solution in said relatively small quantity of electrolyte.

9. A method of operation of a metal-air battery as recited in claim 8, wherein during said discharging mode of operation of said battery, said ions of said active metal in said electrolyte form deposits of an oxide of said active metal within said battery, and wherein the charging mode of operation of said battery further comprises:
   preliminarily maintaining the electrolyte stationary in said battery while charging said battery with a current having a density less than half of that of an ordinary charging current for said battery, thereby to reduce said deposited oxide of said active metal to a deposit of said active metal.

10. A method of operation of a metal-air battery as recited in claim 8, wherein during said discharging mode of operation of said battery, said ions of said active metal in said electrolyte form deposits of an oxide of said active metal within said battery, and wherein the charging mode of operation of said battery further comprises:
   initially and for a short time interval, circulating said relatively large quantity of electrolyte through said battery to dilute the concentration of metal ions in solution in said electrolyte within said partial electrolyte circulating system of said battery,
   terminating circulation of said relatively large quantity of electrolyte and maintaining the electrolyte stationary in said battery and preliminarily charging said battery with said stationary electrolyte therein, with a current having a density less than half that of an ordinary charging current for the said battery, thereby to reduce the deposited said active metal oxide within said battery to a deposit of said active metal, and
   thereafter charging said battery with an ordinary charging current while circulating said relatively large quantity of electrolyte through said battery by said first electrolyte circulating means.

11. A method of operation of a metal-air battery as recited in claim 8 wherein said electrolyte comprises potassium hydroxide and said active metal comprises a metal selected from the group consisting of zinc and cadmium.

12. A method of operation of a metal-air battery as recited in claim 9 wherein said discharging mode of operation of said battery is effective to produce a saturated solution of said active metal ions in said relatively small quantity of electrolyte and said deposit of said oxide of said active metal within said battery.

* * * * *